United States Patent [19]
Allada

[11] Patent Number: 4,703,105
[45] Date of Patent: * Oct. 27, 1987

[54] EXTRACTION OF RESIDUES FROM STYRENIC POLYMERS

[75] Inventor: Sambasiva R. Allada, Midland, Mich.

[73] Assignee: The Dow Chemical Company, Midland, Mich.

[ * ] Notice: The portion of the term of this patent subsequent to Sep. 22, 2004 has been disclaimed.

[21] Appl. No.: 812,440

[22] Filed: Dec. 23, 1985

[51] Int. Cl.$^4$ .......................... C08F 6/00; C08F 6/28; C08J 3/00
[52] U.S. Cl. .................................. 528/483; 528/490; 528/498; 528/503
[58] Field of Search ............... 528/483, 498, 503, 409; 210/690; 585/832, 867, 868

[56] References Cited

U.S. PATENT DOCUMENTS 4,061,566  12/1977  Moddell ............................... 210/32

FOREIGN PATENT DOCUMENTS 3323940  1/1985  Fed. Rep. of Germany ...... 528/483

OTHER PUBLICATIONS

Braun, CA 102:25330v, p. 25335 (1984).
"Hackh's Chem. Dictionary", J. Grant (ed.), McGraw-Hill, N.Y. (1969), p. 281.
Translation of Ger. Offen. 3,323,940 to Braun et al.

Primary Examiner—Joseph L. Schofer
Assistant Examiner—F. M. Teskin
Attorney, Agent, or Firm—Veo Peoples, Jr.

[57] ABSTRACT

Bringing polymerizates, particularly those comprising styrene polymerized with an equal amount or more acrylonitrile and containing free styrene and acrylonitrile monomers, into contact with carefully selected gases in the near-critical to supercritical state substantially inhibits depolymerization and decomposition while substantially improving residue extraction.

9 Claims, No Drawings

EXTRACTION OF RESIDUES FROM STYRENIC POLYMERS

BACKGROUND OF THE INVENTION

This invention relates to a process for reducing residual monomers, diluents, solvents and other residues, particularly styrene and acrylonitrile monomers in styrenic polymers and more particularly to products such as packaging materials shaped from the melted polymer wherein free styrene and acrylonitrile monomers therein are reduced.

Thermoplastic polymer compositions, particularly those containing polymerized styrene, can be shaped into a wide variety of useful articles by conventional techniques such as extrusion, milling, molding, drawing, blowing, etc. Applications for such shaped articles are widespread and include structural units where properties such as low thermal deformation impact resistance (when a rubber component such as a butadiene polymer or copolymer is present) and high gloss are required. When acrylonitrile is present with styrene in a copolymer, the compositions uniquely exhibit excellent solvent resistance and low permeability to liquids and gases which make them especially useful as a lightweight substitute for glass in packaging and particularly in the manufacture of bottles, film, sheet, tubs, cups, trays and other containers for liquids and solids.

In manufacturing such polymer compositions, it is well known that free, unconverted, styrene monomer remains absorbed within the polymer particles when polymerization is not 100 percent complete and which is therefore present in products formed therefrom. Additionally present are small amounts of other monomers, solvents, oligomers, catalyst or volatile condensation products which may include for example acrylonitrile, ethylbenzene, toluene, etc. These materials may be detrimental to the ultimate product by reason of off-taste, toxicity, or downgrading of polymer properties via plasticization, depolymerization, etc. Also, government regulatory agencies are moving toward establishing maximum permissible levels of various monomers in the environment on grounds that excess levels may constitute a health hazard, and particularly regulations have been applied to packaging materials intended to contact food, beverages, pharmaceuticals, cosmetics and the like for which application of styrenic copolymers are especially suited.

Even though previously employed processes for vacuum stripping of polymer melts or solvent extracting finished polymer, as for example with alcohols or water, does reduce residual monomers, it has been found that free styrene and acrylonitrile monomers are thermally regenerated during subsequent high temperature operations such as melt processing. Depending on the level of monomers present in the polymer before melting, such an increase of regenerated monomer could lead to monomer leaching into foodstuffs which themselves simulate solvents and/or having the monomers released into the atmosphere around melt processing equipment.

Attempted alternatives to stripping the polymers have included for example chemically reducing various monomers with scavenger compounds. One example of such a prior art process may be found in U.S. Pat. No. 4,274,984.

It is undesirable in many food packaging applications to introduce scavenging compounds because they may not be inert to the other constituents of the polymer melt or may come in contact with the packaged food product. Furthermore, the prior art processes have been ineffective in reducing other residuals of the melt such as acrylonitrile and ethylbenzene to acceptable levels. Additionally, the prior art methods are relatively time consuming and fail to improve any property of the polymer other than residue reduction.

SUMMARY OF THE INVENTION

Now, however, a process has been developed to minimize such prior art shortcomings.

Accordingly, a principle object of this invention is to minimize generation of free styrene and acrylonitrile monomers during the conversion into melt-form of a polymer composition containing polymerized styrene.

Additionally, it is an object of this invention to negate the need for chemical scavengers in reducing residual free monomers in thermoplastic polymer packaging materials.

Another object is to reduce to extremely low levels the residual solvents, oligomers, catalyst or volatile condensation products that may be present particularly in styrenic polymer materials.

It is a still further object of the present invention to enhance the molecular weight distribution of the polymers and to do so more rapidly than by use of prior art methods.

These and other objects are accomplished by bringing the polymerizate, either in the solid or the molten state, into contact with carefully selected gases at or near the supercritical state.

From a product standpoint, a shaped article is provided which is formed of a thermoplastic polymer comprising in polymerized forms styrene and acrylonitrile containing reduced free styrene monomer, less than 0.3 ppm free acrylonitrile, and reduced ethylbenzene. By the term "reduced" is meant that amounts less than those attained by vacuum stripping, solvent extraction, or introduction of chemical scavengers into the same polymer are attained.

DETAILED DESCRIPTION OF THE PREFERRED EMBODIMENTS

Polymers useful in the present invention may constitute either homopolymers or copolymers. It is particularly preferred that the polymers are ones which customarily generate free styrene monomer and contain at least about 10 percent by weight of polymerized styrene together with one or more copolymerized comonomers, as for example Acrylonitrile-Butadiene-Styrene, Styrene Acrylonitrile, Polystyrene, and High Impact Polystyrene. Other monomers may include:

(a) monovinylidene aromatic hydrocarbon monomers other than styrene of the formula:

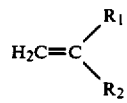

wherein $R_1$ is hydrogen, chlorine or methyl and $R_2$ is an aryl group of 6 to 10 carbon atoms and may also contain substituents such as halogen as well as alkyl groups attached to the aromatic nucleus, e.g. alpha methylstyrene, vinyl toluene, alpha chlorostyrene, ortho chlorostyrene, para methylstyrene, ethyl styrene, isopropyl styrene, dichlorostyrene, vinyl naphthalene, etc.;

(b) lower alpha olefins of from 2 to 8 carbon atoms, e.g. ethylene, propylene, isobutylene, butene-1, pentene-1 and their halogen and aliphatic substituted derivatives, e.g. vinyl chloride, vinylidene chloride, etc.;

(c) acrylic acid and methacrylic acid and the corresponding acrylate and methacrylate esters where the alkyl group contains from 1 to 4 carbon atoms, e.g. methyl acrylate, ethyl acrylate, propyl acrylate, methyl methacrylate, etc.;

(d) vinyl esters of the formula:

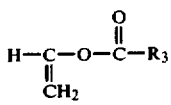

wherein $R_3$ is hydrogen, an alkyl group of from 1 to 10 carbon atoms, an aryl group of 6 to 10 carbon atoms, e.g. vinyl formate, vinyl acetate, vinyl propionate, vinyl benzoate, etc.;

(e) vinyl ether monomers of the formula: $H_2C=CH-O-R_4$ wherein $R_4$ is an alkyl group of from 1 to 8 carbon atoms, an aryl group of from 6 to 10 carbon atoms, an aryl group of from 6 to 10 carbon atoms or a monovalent aliphatic radical of from 2 to 10 carbon atoms, which aliphatic radical may be hydrocarbons or oxygen-containing, i.e. an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.;

(f) olefinically unsaturated mononitriles having the formula:

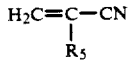

wherein $R_5$ is hydrogen, an alkyl group having 1 to 4 carbon atoms or a halogen. Such compounds include acrylonitrile, methacrylonitrile, ethacrylonitrile; propioacrylonitrile, alpha chloroacrylonitrile, etc.

Additional comonomers useful in the practice of this invention are those containing a mono- or di-nitrile function. Examples of these include methylene glutaronitrile, 2,4-dicyanobutene-1, vinylidene cyanide, crotonitrile, fumaronitrile, maleonitrile.

Preferred comonomers are the olefinically unsaturated mononitriles, monovinylidenes, aromatic hydrocarbons, lower alpha olefins, acrylic and methacrylic acid and the corresponding acrylate and methacrylate esters, with the olefinically unsaturated mononitrile hydrocarbons being more particularly preferred. Most specially preferred is acrylonitrile and alpha methylstyrene.

In styrenic compositions, the amount of comonomer can vary up to about 90% by weight based on the total weight of the styrenic polymer composition. Preferred styrenic compositions of this invention, for packaging applications requiring excellent oxygen and water vapor barrier properties in the packaging materials contain from about 10 to about 90% by weight of polymerized styrene monomer and from about 90 to about 10% by weight of polymerized acrylonitrile comonomer and more preferably from about 15 to about 45% by weight of styrene monomer and from about 85 to about 55% by weight of acrylonitrile monomer, all based on total polymer weight.

Styrenic polymers within the scope of this invention may also contain an elastomer in the form of a synthetic or natural rubber component such as polybutadiene, polyisoprene, neoprene, nitrile rubbers, styrene-butadiene copolymers, acrylonitrile-butadiene copolymers, ethylene-propylene copolymers, ethylene-propylene-diene terpolymers, chlorinated rubbers, etc. which are used to strengthen or toughen products such as shaped packaging materials. This rubber component may be incorporated into the styrene polymer by any of the methods well known to those skilled in the art, e.g. solution, mass or emulsion graft polymerization of at least some of the monomers of the styrene polymer in the presence of the rubber and subsequent blending of the grafted rubber and optionally additional matrix polymer by solution or melt blending techniques; or merely blending by such techniques the rubber and the styrene polymer. Especially preferred are polyblends derived by the first technique. Generally, the rubber component may comprise from 0 to about 25% and preferably from 5 to about 10% by weight of the styrenic polymer composition.

In the process of this invention, it has been discovered that selection of particular solvent gases at near critical to supercritical conditions drastically improves extraction while inhibiting depolymerization and decomposition of residual monomers. Suitable gases are those which are supercritical below the glass transition temperature (for solid extraction) of the polymers and which exhibit sufficient solvation of the key monomers. More specifically, the solvent gas should have a critical temperature in the range of +20° C. to −100° C. of the process temperature, more preferably −10° C. to −30° C. except in the case of $CO_2$ where the critical temperature may be as low as 210° C. below the process temperature if desired. The extraction temperature used in the process for molten polymers is largely determined by the supercritical temperature of the gas to be employed and may be adjusted according to other parameters well known to those skilled in the art such as desired polymer viscosity, polymer stability, safe operating pressures, etc. For solid state extraction, the critical temperature of the selected gas is desirably near room temperature but below the glass transition temperature of the polymer. The extraction temperature may vary from about 0° to 80° C., and preferably 10° C. to 30° C. above the critical temperature of the particular solvent gas chosen.

It is particularly preferred to employ the gases carbon dioxide ($CO_2$) and/or sulfur hexafluoride ($SF_6$) with the styrenic homopolymers and copolymers. The gases substantially reduce not only free styrene monomer, but also acrylonitrile, ethylbenzene and other low molecular weight constituents of the polymer to extremely low levels. Of additional advantage is the capacity of these solvent gases under supercritical conditions to effectively extract either polymer melts or the polymer in solid state.

When extracting non-styrenic polymers such as polyvinyl chloride, polyvinylidene chloride, polyesters, etc. it is especially preferred that the supercritical solvent gas be a halogenated hydrocarbon of 1 to 2 carbons, especially a fluorocarbon or fluorochlorocarbon such as the freons F-11, F-12, F-113 and F-21, i.e. $CH_3F$, $CCl_2F_2$, $CCl_2FCCl_2F$, and $CHCl_2F$, which have also been found to be equally effective on polymers in either solid or molten state. Also of use with such non-styrenic polymers are $C_{2-5}$ alkane or alkylene supercritical solvents, e.g. isopentane, pentane, butane, propane, propylene, ethylene, etc. Care should be exercised during the solid state extraction to select appropriate operating conditions correlated to temperatures as high as possible without softening or plasticizing the polymers being extracted. As a general rule, the extraction temperature should be as high as is practical in order to achieve minimum mixing viscosity and highest volatility of residues to be extracted. Temperatures must also remain below the depolymerization and decomposition temperatures of the polymers while optimizing the energy expended in the operation.

The pressure during extraction is subject to the temperature chosen for the extraction and further subject to equipment cost-effectiveness and safety. It is preferred that the operating pressure range from that of the critical pressure ($P_c$) of the solvent gas to that of 5 times the critical pressure ($P_c$) of such solvent gas, but more preferably from 1.2 $P_c$ to 3 $P_c$.

The duration of the extraction may vary depending upon the degree of residue removal desired and the proximity of the extraction temperature to the decomposition temperature. Moreover, in said extractions, the particle size of the polymer being subjected to extraction will affect the time required for extraction. In normal operation, effective removal of residues from styrenic polymers is achieved in from about one to about 60 minutes.

Entrainers such as water, alcohols, $N_2O$, $C_2H_4$, etc. may be used in amounts as low as 2–30%, preferably 5–15% of the weight of the solvent gas to enhance the extraction.

In addition to the removal of undesirable residues from the polymer, the present invention has the advantage of enhancing the molecular weight distribution of the polymer and so rapidly that the need for extraneous process techniques to accomplish this end are substantially negated. The resulting product usually contains substantially reduced amounts of low molecular weight components especially dimers or trimers and provides a relatively narrow molecular weight distribution product.

The process of this invention may be conducted by bubbling or sparging the gas through the polymerizate contained in a pressure vessel or if desired, an extruder. In one preferred embodiment of this invention, the supercritical solvent is passed through a battery of extractors containing polymer granules. The extracted residue is absorbed on adsorbents such as activated charcoal in a separate column. The remaining solvent is recirculated, and when the adsorbent approaches saturation, the adsorbent column is isolated and the residue desorbed thermally. The volatile residue containing extracted components may then be condensed in a cooler.

In one particularly preferred embodiment of the invention, the supercritical solvent is first added to the polymer melt in an extruder and mixed. The mixture is flashed or devolatilized to separate the residue and solvent from the polymer.

The forming operations used to prepare products within the scope of this invention such as the preferred polymeric packaging materials, e.g. sheet, tubs, trays, containers such as bottles, cans jars, etc., preforms for forming same and the like are procedures known in the the prior art. Examples of forming operations used to prepare shaped polymeric packaging materials include pelletizing, extrusion, blow molding, injection molding, compression molding, mill rolling, vacuum forming, plug assist thermoforming from sheet material, combinations of the foregoing and the like.

The present invention also contemplates the use of additives and ingredients in the polymeric compositions to provide desired modified properties. Examples of these ingredients include thermal stabilizers, light stabilizers, dyes, pigments, plasticizers, fillers, antioxidants, lubricants, extrusion aids, etc. If unaffected by supercritical extraction according to the invention, such additives may be added prior to the extraction step or more generally, afterwards.

The following examples are set forth in illustration of the invention and should not be construed as limitations thereof. All parts and percentages are by weight unless otherwise specified.

EXAMPLE I

Styrenic copolymers in granular form containing 76% polymerized styrene, 17% polymerized acrylonitrile and 7% butadiene having a melt flow index of 5.5 gm/10 minutes prepared by conventional polymerization methods were passed through a battery of five extractors, extracted under various conditions, and the residue analyzed. Results of the analysis appear in Table I.

TABLE I

| | Sample | | | | | | | | | | |
|---|---|---|---|---|---|---|---|---|---|---|---|
| | 1 | 2 | 3 | 4 | 5 | 6 | 7 | 8 | 9 | 10 | 11 |
| Solvent | Carbon Dioxide | | | | | | | | Sulfur Hexafluoride | | |
| Particle Size, mesh | 7 | 12 | 16 | 7 | 12 | 16 | 12 | 16 | 7 | 12 | 16 |
| Temperature, °C. | 61 | 61 | 61 | 36 | 40 | 40 | 60 | 60 | | 66 | |
| Pressure, psi | 1500 | 1500 | 1500 | 1520 | 1525 | 1525 | 1500 | 1500 | | 1230 | |
| Extraction Time, Min. | 30 | 30 | 30 | 60 | 60 | 60 | 120 | 120 | | 60 | |
| Initial Residues, ppm | | | | | | | | | | | |
| Acrylonitrile (AN) | | | | | 11 | | | | | 11 | |
| Ethylbenzene (EB) | | | | | 830 | | | | | 1030 | |
| Styrene (St) | | | | | 1540 | | | | | 1900 | |
| Final Residues, ppm | | | | | | | | | | | |
| AN | 8.5 | 1.0 | 0.7 | 4.5 | 1.4 | 0.7 | 0.1 | <0.1 | 10.4 | 4.6 | 3.4 |
| EB | 600 | 470 | 390 | 750 | 440 | 270 | 260 | 190 | 960 | 900 | 700 |

TABLE I-continued

| | Sample | | | | | | | | | | |
|---|---|---|---|---|---|---|---|---|---|---|---|
| | 1 | 2 | 3 | 4 | 5 | 6 | 7 | 8 | 9 | 10 | 11 |
| St | 1300 | 960 | 900 | 1500 | 810 | 600 | 400 | 160 | 1800 | 1700 | 1500 |

EXAMPLE II

Styrenic copolymers in granular form containing 75% polymerized styrene and 25% polymerized acrylonitrile having a melt flow index of 9.5 gm/10 minutes were prepared by conventional emulsion polymerization methods. The granules were passed through a battery of five extractors extracted under various supercritical conditions with carbon dioxide, and the residue was analyzed. The results of the analysis appear in Table II.

TABLE II

| | Sample | | | | | | | | |
|---|---|---|---|---|---|---|---|---|---|
| | 1 | 2 | 3 | 4 | 5 | 6 | 7 | 8 | 9 |
| Solvent | Carbon Dioxide | | | | | | | | |
| Particle Size, mesh | 7 | 12 | 16 | 7 | 12 | 16 | 7 | 12 | 16 |
| Temperature, °C. | 24 | 24 | 24 | 23 | 23 | 23 | 67 | 39.5 | 39.5 |
| Pressure, psi | 200 | 200 | 200 | 860 | 860 | 860 | 1650 | 1525 | 1525 |
| Time, minutes | 60 | 60 | 60 | 60 | 60 | 60 | 60 | 60 | 60 |
| Initial Residues, ppm | AN = 17; EB = 500; St = 2000 | | | | | | | | |
| Final Residues, ppm | | | | | | | | | |
| AN | 15 | 12 | 12 | 14 | 8.9 | 7.5 | 13.5 | 3.4 | 1.8 |
| EB | 250 | 230 | 200 | 370 | — | 180 | 260 | 160 | 110 |
| St | 970 | 970 | 930 | — | 810 | 790 | 840 | 560 | 500 | temperature of from about 39.5° C. to not more than about 60° C., under supercritical pressure conditions, but not more than about 1,525 psi, for a period of from 30 minutes to about 120 minutes, separating the extractant and thereafter forming the polymerizate into packaging material; whereby the product is substantially free of residual acrylonitrile monomer and contains substantially reduced residual styrene monomer without the need for imparting excessively high pressures or long hours of extraction time, and without the need for chemical scavenger.

What is claimed is:

1. A method of making products formed of thermoplastic styrenic polymer comprising bringing molten polymerizate having acrylonitrile polymerized with styrene into contact with a solvent gas extractant having a critical temperature within the range of from 210° C. below to 20° C. above the process temperature or temperature at which the residual free styrene monomer can be extracted and at a pressure above the critical pressure of the solvent gas, separating the extractant and thereafter forming the polymerizate into packaging material; whereby depolymerization and decomposition is substantially inhibited; other residual monomers, oligomers, solvents, diluents and volatile condensation by-products are substantially reduced; and the need for chemical scavengers is negated.

2. An improved method for making products formed of thermoplastic styrenic polymer having acrylonitrile polymerized with styrene; the improvement comprising extracting the acrylonitrile/styrene polymerizate with a solvent gas in the supercritical state at an extraction 3. The method of claim 2 wherein the polymerizate contains about 10–90% by weight polymerized styrene and 90–10% by weight polymerized acrylonitrile.

4. The method of claim 2 wherein from about 15 to 45 weight percent styrene is polymerized with 85 to 55 weight percent acrylonitrile.

5. The method of claim 2 wherein the critical temperature of the solvent gas is within the range of from 10° C. to 30° C. below the extraction temperature.

6. The method of claim 2 wherein the pressure is from 1.2 to 3 times the critical pressure of the solvent gas.

7. The method of claim 2 wherein the solvent gas is $CO_2$.

8. The method of claim 2 wherein the extraction is conducted for a period of 2 hours using carbondioxide as the solvent gas at 60° C. under a pressure of 1500 psi.

9. The method of claim 2 wherein the extraction is conducted on granular form polymerizates having a particle size greater than 7 mesh.

* * * * *

UNITED STATES PATENT AND TRADEMARK OFFICE
CERTIFICATE OF CORRECTION

PATENT NO. : 4,703,105

DATED : October 27, 1987

INVENTOR(S) : Sambasiva R. Allada

It is certified that error appears in the above-identified patent and that said Letters Patent is hereby corrected as shown below:

Column 7, line 21, Table II, "Sovlent" should read -- Solvent --.

Column 8, line 17, "scavenger" should read -- scavengers --.

Signed and Sealed this

Seventh Day of June, 1988

Attest:

DONALD J. QUIGG

*Attesting Officer*     *Commissioner of Patents and Trademarks*